United States Patent [19]

McTaggart

[11] Patent Number: 5,449,062
[45] Date of Patent: Sep. 12, 1995

[54] LIFT AND CARRY CONVEYOR

[75] Inventor: Michael D. McTaggart, Windsor, Canada

[73] Assignee: Valiant Machine & Tool, Inc., Windsor, Canada

[21] Appl. No.: 136,707

[22] Filed: Oct. 15, 1993

[51] Int. Cl.6 .............................................. B65G 25/00
[52] U.S. Cl. .................... 198/774.3; 198/774.1; 198/860.1
[58] Field of Search .................. 198/773, 774.1, 774.2, 198/774.3, 774.4, 860.1, 860.3

[56] References Cited

U.S. PATENT DOCUMENTS

| | | | |
|---|---|---|---|
| 4,155,443 | 5/1979 | Schuricht | 198/774.3 |
| 4,496,042 | 1/1985 | Rise | 198/774.3 |
| 4,653,344 | 3/1987 | Nelson | 198/774.3 X |
| 4,928,811 | 5/1990 | Waineo | 198/774.4 |
| 5,186,314 | 2/1993 | Clopton | 198/860.1 X |
| 5,193,662 | 3/1993 | McCulloch et al. | 198/774.1 |

FOREIGN PATENT DOCUMENTS 1051003  10/1983  U.S.S.R. .......................... 198/774.3

Primary Examiner—James R. Bidwell
Attorney, Agent, or Firm—Gifford, Krass, Groh, Sprinkle, Patmore, Anderson & Citkowski

[57] ABSTRACT

An improved conveyor system and for a lift and carry type conveyor includes a pair of extruded stationary rails and a pair of extruded movable rails. The extruded stationary and movable rails are provided with T slots for modular installation. The improved stationary rail includes an elongated one piece body which is generally L shaped cross section having an upper and generally horizontal leg and a lower generally vertical leg. The improved movable rails include an upper end having a finger formed of thermo plastic wear material and a protection strip of the same material to protect against galling.

6 Claims, 2 Drawing Sheets

LIFT AND CARRY CONVEYOR

BACKGROUND OF THE INVENTION

1. Field of the Invention

The present invention relates generally to conveyors and, more particularly, to a lift and carry accumulating conveyor.

2. Description of the Prior Art

Lift and carry conveyors for transporting various types of parts along a conveyor line are well known. Lift and carry conveyors, such as disclosed in U.S. Pat. No. 4,838,411 to Rainey et al typically comprise a pair of spaced apart and parallel stationary rails as well as at least one movable rail which extends generally parallel to the stationary rails. The movable rail is movable both between a forward and a retracted position as well as between an upper and a lower position. Thus, in order to convey parts supported by the stationary rails along the conveyor line the movable rail, when in its retracted or lower position, is first moved to an upper position thus lifting the parts up from the stationary rails. The movable rail is then moved to the forward position and, thereafter, to the lower position. When the movable rail is moved to the lower position, the parts are again placed upon the stationary rail so the parts are effectively transported along the conveyor line by the distance equal to the stroke of the movable rail between its forward and retracted position. The movable rail is then moved to its lower retracted position and the above cycle is repeated.

The production of the stationary rails for lift and carry conveyor systems is generally quite complex and expensive. The rails are fabricated out of several pieces of metal which are welded together. Assembly of the conveyor system requires extensive machining of the rails to produce bores and apertures for mounting the rails. In addition, the rails must frequently be adapted for mounting of support accessories such as limit switches, sensors, covers and the like. It has been the practice to individually measure mounting holes in the conveyor rails for these accessories when fabricating the conveyor rails for a particular conveyor system. Such a procedure, however, is time consuming and thus, increases the overall labor cost of the conveyor system.

Likewise, the movable rails must be precisely formed and positioned in order to properly engage the part to be moved without damaging the part. Slight changes in the size and shape of the parts may require the fabrication of new rails in order to provide properly formed and positioned surfaces for engaging the part. The production of new rails is quite expensive and replacement of the rails can be quite time consuming.

SUMMARY OF THE INVENTION

The present invention provides a lift and carry conveyor which overcomes the above-mentioned disadvantages of the previously known conveyor systems. The lift and carry conveyor system of the present invention includes a frame having a pair of elongated spaced apart parallel stationary rails. Each stationary rail has an extruded L-shaped body preferably made of aluminum. The body has several longitudinal T slots formed for accepting T nuts for fastening the rails to the frame, and easy and adjustable fastening of accessories such as limit switches, sensors, covers and the like to the rails.

The lift and carry conveyor system also includes a pair of elongated spaced apart movable rails mounted to the frame also of an aluminum extrusion. The movable rails include an extruded lift member having a finger formed of ultra high molecular weight material. The finger has a surface formed to be complementary with a portion of the part to be moved. The surface engages a portion of the part when the rails are moved to an upper position. T slots are formed in the lift member for mounting the movable rails and for mounting the finger to the lift member. Additionally a channel may be formed on a vertical lateral surface of the lift member for installation of a protection strip to protect the parts from damage.

BRIEF DESCRIPTION OF THE DRAWING

A better understanding of the present invention will be had upon reference to the following detailed description when read in conjunction with the accompanying drawing, wherein like reference characters refer to like parts throughout the several views and in which.

DETAILED DESCRIPTION OF A PREFERRED EMBODIMENT OF THE PRESENT INVENTION

Figure 3:
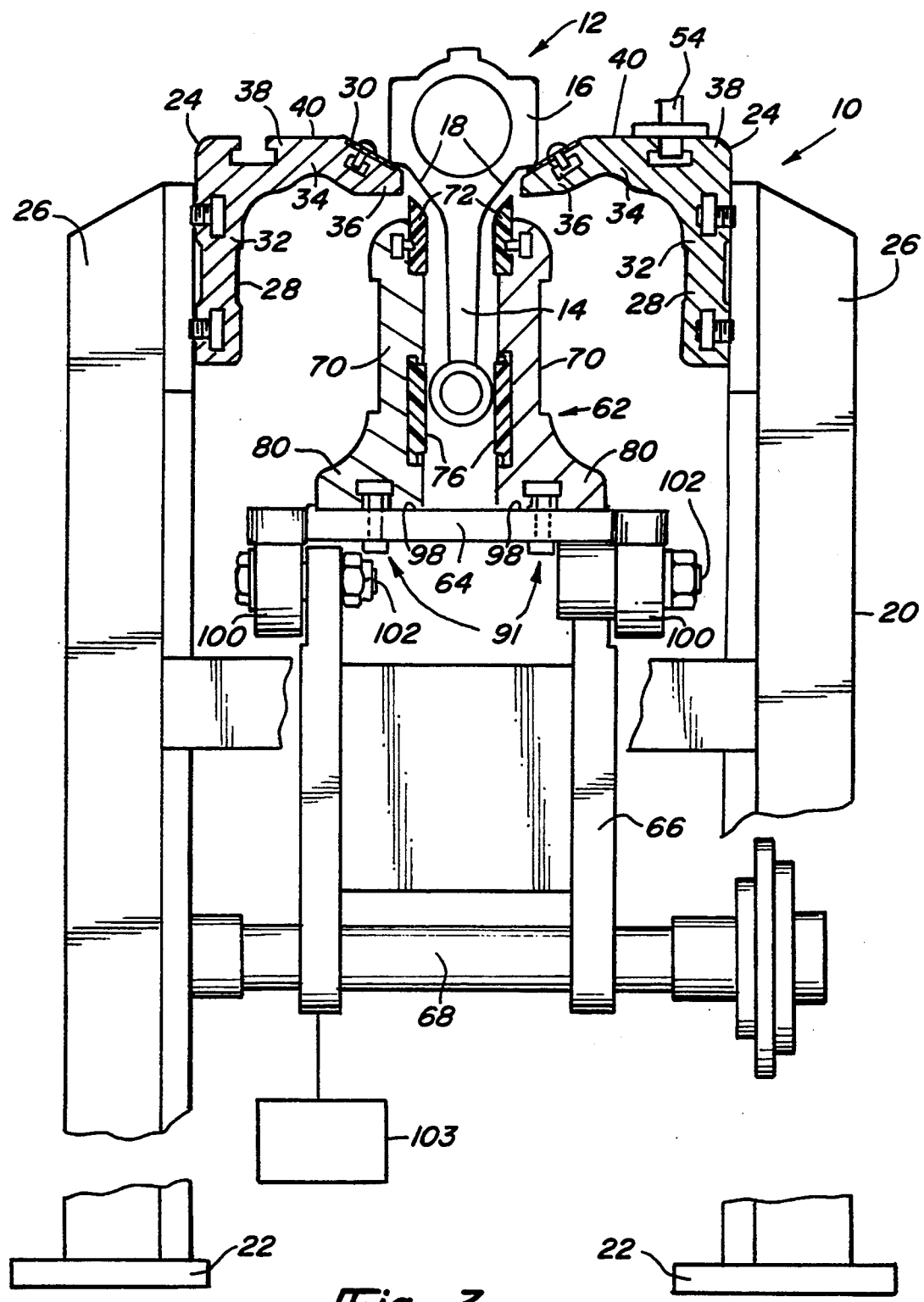
FIG. 3 is a cross sectional view of a conveyor system according to the present invention.

With reference to FIG. 3, a cross sectional view of a lift and carry conveyor system 10 of the present invention is thereshown for transporting parts such as a connecting rod 12 along a conveyor line. The connecting rod 12 has an elongated rod section 14 as well as a crank shaft connecting portion 16. The crank shaft connecting portion 16 further includes a pair of side surfaces 18 which extend outwardly from the elongated rod section 14. It will be understood, however, that although the conveyor system 10 of the present invention will be described as conveyor for transporting the connecting rods 12 along the conveyor line, the conveyor system 10 can be alternatively be adapted for other types of parts.

Figure 1:
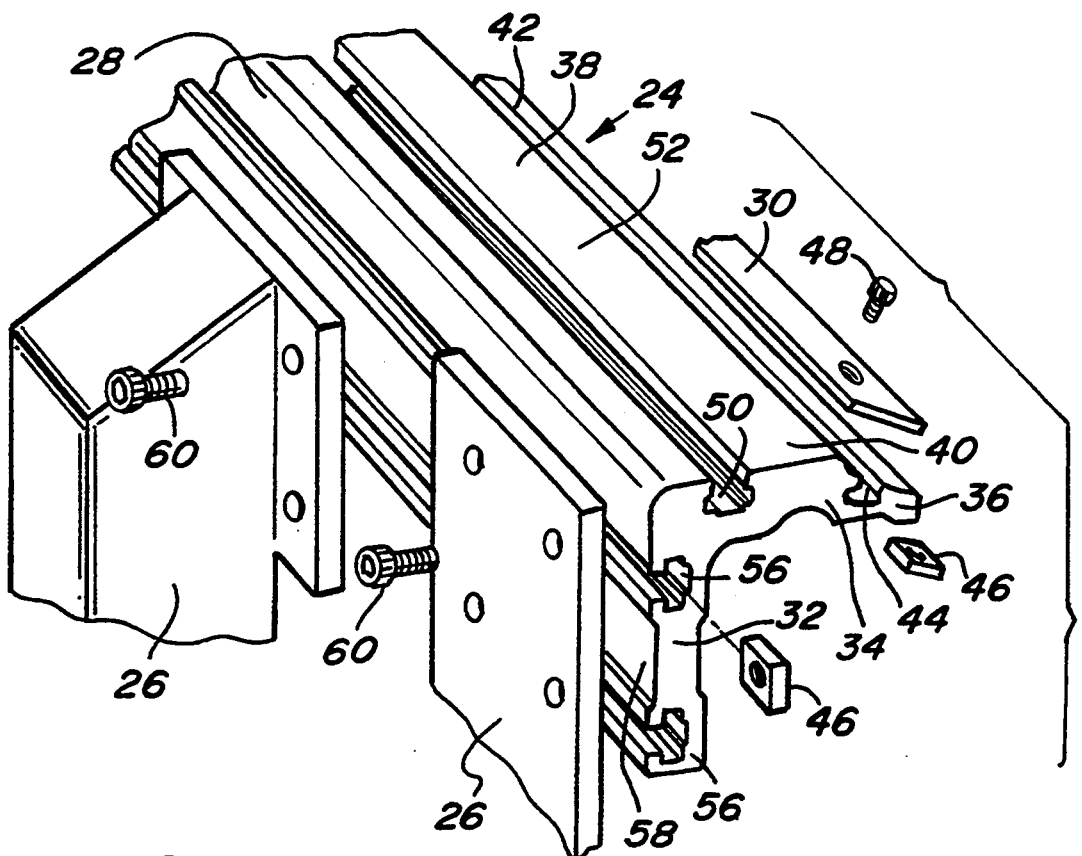
FIG. 1 is an exploded partial perspective view of a portion of a frame in a stationary rail of the present invention.

With reference to FIG. 3, the conveyor system 10 includes a frame 20 which is supported by feet 22 adapted to be mounted to a ground surface (not shown). A pair of elongated spaced apart parallel stationary rails 24 are mounted to a top portion 26 of the frame. As best shown in FIG. 1, each of the stationary rails 24 is formed having an L-shaped body 28 and a strip 30 of hard material. The body 28 has a vertical leg 32 extending from a horizontal leg 34. The body 28 is formed of an extrusion of a suitable material such as aluminum. The extruded body 28 is formed in convenient lengths such as approximately ten feet. The horizontal leg 34 has a free end portion 36 extending from an intermediate portion 38. The free end portion 36 has an outer surface 40 which extends downwardly outwardly to act with an opposite rail to center the part over a pair of movable rails 62. In the preferred embodiment, the elongated strip 30 of a hard material, such as spring steel, is mounted in a channel 42 formed along the horizontal leg 28 to prevent galling of the crankshaft portion 16. The end portion 36 of the horizontal leg 34 is provided with a longitudinally extending T slot 44 for accepting T nuts 46. The elongated strip 30 is secured to the end position 36 by a threaded fastener 48 which engages the T nuts 46 in the T slot 44. The intermediate portion 38 of the horizontal leg 34 is also provided with a T slot 50 which extends longitudinally through a top surface 52 of the horizontal leg 34 to accept T nuts for the mounting of an accessory 54 such as limit switches, sensors, covers and the like. As shown in FIG. 3 the use of the T slot 50 provides for adjustability and easy mounting of the accessory 54 in the desired location.

As shown in FIG. 1, the vertical leg 32 is provided with a pair of spaced apart longitudinally extending T slots 56 which are opened to an outer surface 58 of the vertical leg. The pair of T slots 56 are provided for accepting T nuts 46 for fastening the stationary rails 24 to the top portion 26 of the frame 20 by way of bolts 60.

As shown in FIG. 3, a pair of movable rails 62 are mounted to a platen 64 which is supported by an arm 66 affixed to a shaft 68. The shaft 68 is connected to a lifting mechanism (not shown) which acts to move the platen 64 and movable rails 62 between a forward and a retracted position and also between an upper and a lower position. In FIG. 3, the movable rails 62 are shown in a lower and retracted position. The movable rails 62 extend generally parallel to the stationary rails 24 and when in the upper position act to engage the part 12 to be moved.

Figure 2:
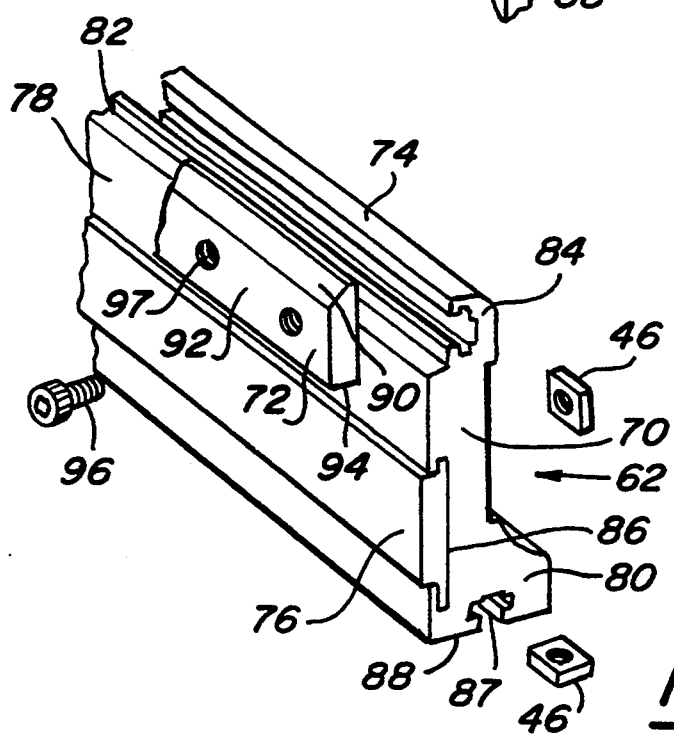
FIG. 2 is an exploded partial perspective view of a portion of movable rail in accordance with the present invention.

Each movable rail 62 includes elongated lift member 70 having a finger 72 mounted in a top portion 74 and a protection strip 76 mounted on a lateral surface 78. The lift member 70 is formed as an extrusion of a suitable metal such as aluminum and is formed in convenient lengths of approximately ten feet. The lateral surface 78 extends between the top portion 76 and a bottom portion 80 of the lift member 70. As best shown in FIG. 2, a L-shaped groove 82 is formed in the lateral surface 78 to accept the finger 72. A T slot 84 extends longitudinally through the top portion 74 and opens into the L shaped groove 82 to accept a nut 46 for mounting of the finger 72 to the lift member 70.

A T slot 86 is formed in the lateral surface 78 to accept the protection strip 76. The protection strip extends longitudinally along the lateral surface 78 and is positioned so that the elongated portion 14 of the connecting rod 12 will contact the protection strip 76, if the connecting rod is out of alignment. The protection strip is dimensioned to protect the conveyor rod from damage regardless of whether the rails 62 are in the lower or upper position. The protection strip 76 is formed of a suitable material such as a thermo plastic wear material of an ultra high molecular weight (UHMW) and is formed with dimensions complementary to the shape of a T slot. The protection strip 76 may be slipped into the T slot 86 for easy replacement of the protection strip in the event of wear. The protection strips 76 prevent galling of the lift members and the connecting rods 12.

A T slot 87 is formed to extend longitudinally through the bottom portion 80 of the lift member 70 and opens through a bottom surface 88 to receive T nuts 46 for mounting the lift member 70 to the platen 64, as shown in FIG. 3. Bolts 91 are threaded into the T nuts 46 through the platen 64 for easy installation of the lift member.

As shown in FIG. 2, the finger 72 has an angled top surface 90 which is formed to be complementary to the shape of the part crank shaft which is engaged by the finger 72 when the lift member is raised. The angled surfaces 90 of the fingers are disposed to center the crank shaft and maintain a proper alignment. The finger 72 has a side surface 92 and a bottom surface 94 which are positioned within the groove 82 of the top portion 74 of the lift member. The finger 72 is held in position by a threaded member 96 which extends through a bore 97 to engage T nut 46 in the T slot 84 of the top portion 74 of the lift member 70. The finger 72 is formed of a suitable material such as thermo plastic wear material of ultra high molecular weight (UHMW). The finger 72 extends the length of the lift member 70 and may be easily changed in the case of wear or change in the shape and size of the part to be lifted.

As shown in FIG. 3, the platen 64 is formed with a pair of shallow grooves 98 for positioning lift members 70. The platen has a pair of downwardly extending ears 100 which are mounted to the arm 66 by bolts 102. The arm 66 is pivotally attached to the ears 100 so that the movable rails remain in a vertical alignment as they are being moved between the upper and lower as well as forward and back to position by the shaft 68 in conjunction with the movement mechanism.

As set forth above, any conventional movement mechanism may be used with the conveyor system according to the invention.

It can thus be seen that the present invention provides an unique conveyor system which facilitates the production, installation and repair of the conveyor. Furthermore, the elongated T slots, which extend along the length of the conveyor rail, facilitate the placement and adjustment of the sensors, limit switches, stop devices, guards and the like and allow the rails to be used in a modular fashion to accomodate different conveyor designs. Furthermore, the use of the extrusions 24 and 70 not only reduces the overall cost of the conveyor system, but also minimizes assembly time and the resultant assembly labor costs.

Having described my invention, however, many modifications thereto will become apparent to those skilled in the art to which it pertains without deviation from the spirit of the invention as defined by the scope of the appended claims.

I claim:

1. A stationary conveyor rail for use with a conveyor system having a frame supporting two spaced apart stationary rails and a pair of movable rails forming a conveyor line, said pair of movable rails adapted to life said at least one part and move it longitudinally with respect to said stationary rails, said stationary conveyor rail comprising:

an one piece elongated body, said body being generally L-shaped in cross sectional shape and having a generally horizontal leg and a generally vertical leg, said horizontal leg having an end portion adapted to support a portion of said at least one part when said at least one part is not being supported by said pair of movable rails wherein said body comprises an extrusion having at least one first slot formed longitudinally along said vertical leg, a fastener extending between the frame and said first slot for securing said body to the frame, wherein said body further includes an elongated second slot formed longitudinally along an upper surface of and spaced from said end portion of said horizontal leg, said second slot adapted to receive a fastener for securing an accessory to said body.

2. The conveyor rail as defined in claim 1 wherein said first and second slot each comprises a T-slot.

3. The conveyor rail as defined in claim 1 wherein said end portion has a shape complementary to said portion of said at least one part contacting said rail.

4. The conveyor rail as defined in claim 1 further comprising an elongated member of durable material mounted to said end portion of said horizontal leg to prevent galling of said body and said at least one part.

5. A conveyor system comprising:

a frame;

a pair of stationary rails, each of said stationary rails having an elongated body generally L-shaped in cross-sectional shape, a generally horizontal leg and a generally vertical leg, said horizontal leg having an end portion adapted to support a portion of at least one part;

a pair of movable rails, each of said movable rails having an elongated member having an upper portion adapted to engage said at least one part; and means for moving said pair of movable rails with respect to said stationary rails to engage said at least one part for moving said part longitudinally with respect to said stationary rails wherein said body comprises an extrusion having at least one first slot formed longitudinally along said vertical leg, a fastener extending between the frame and said first slot for securing said body to the frame, wherein said body further includes an elongated second slot formed longitudinally along an upper surface of and spaced from said end portion of said horizontal leg, said second slot adapted to receive a fastener for securing an accessory to said body.

6. The conveyor rail as defined in claim 5 wherein said elongated member comprises an extrusion.

* * * * *